United States Patent [19]

Kapon

[11] Patent Number: 4,846,540

[45] Date of Patent: Jul. 11, 1989

[54] OPTICAL WAVEGIDE JUNCTION

[75] Inventor: Elyahou Kapon, Old Bridge Township, Middlesex County, N.J.

[73] Assignee: Bell Communications Research, Inc., Livingston, N.J.

[21] Appl. No.: 148,294

[22] Filed: Jan. 25, 1988

[51] Int. Cl.⁴ .............................................. G02B 6/10
[52] U.S. Cl. ............................. 350/96.12; 350/96.13
[58] Field of Search .......................... 350/96.12, 96.13

[56] References Cited

U.S. PATENT DOCUMENTS

| 4,139,259 | 2/1979 | Kersten et al. | 350/96.13 |
| 4,168,107 | 9/1979 | Sauter | 350/96.13 |
| 4,674,827 | 6/1987 | Izutsu et al. | 350/96.12 |
| 4,722,583 | 2/1988 | Stewart | 350/96.13 |
| 4,737,002 | 4/1988 | Boucouvalas | 350/96.13 |
| 4,738,502 | 4/1988 | Mikami et al. | 350/96.13 |

FOREIGN PATENT DOCUMENTS

| 165122 | 12/1981 | Japan | 350/96.13 |
| 60-37531 | 2/1985 | Japan | 350/96.13 |

OTHER PUBLICATIONS

"Dielectric Thin Film Optical Branching Waveguide", *Appl. Phys. Lett.*, H. Yajima, Jun. 15, 1973, vol. 22, No. 12, pp. 647-649.

"Optical-Waveguide Hybrid Coupler", *Optics Letters*, M. Izutsu et al., Nov. 1982, vol. 7, No. 11, pp. 549-551.

"Synthesis and Characterization of $TiO_2$–$Nb_2O_5$ Borosilicate Glasses for Nonlinear Optical Waveguides", *Mat. Res. Soc. Sym. Proc.*, E. M. Vogel et al, 1987, vol. 88, pp. 101-105.

*Primary Examiner*—William L. Sikes
*Assistant Examiner*—Robert E. Wise
*Attorney, Agent, or Firm*—James W. Falk

[57] ABSTRACT

An optical waveguide junction including a multimode input waveguide and a plurality of n spaced apart output waveguides, disposed on a substrate. Each of the output waveguides has a different propagation constant, (e.g., by having different widths or indices of refraction), so that the input modes of optical radiation are sorted in a predetermined way into n groups of output modes corresponding to the n output waveguides. If the input waveguide is excited with optical radiation of different wavelengths, the output waveguides may be tailored with specific widths and indices of refraction to sort the input radiation into the n output waveguides as a function of wavelength, thereby demultiplexing the input optical signal. More generally, the junction may also be utilized with m input waveguides and n output waveguides to implement routing, switching, modulation, and wavelength multiplexing/demultiplexing.

16 Claims, 3 Drawing Sheets

OPTICAL WAVEGIDE JUNCTION

REFERENCE TO RELATED APPLICATIONS

The present application is related to Y. Silberberg, U.S. Pat. application Ser. No. 026,639, filed Mar. 17, 1987, assigned to the assignee of this application, now U.S. Pat. No. 4,775,207, Oct. 4, 1988.

BACKGROUND OF THE INVENTION

1. Field of the Invention

The invention relates to optical waveguide junctions for use in guided-wave optics and in particular to a multimode channel waveguide that is useful for selective mode excitation, routing, switching, modulation, and wavelength multiplexing/demultiplexing.

2. Description of the Prior Art

The use of optical waveguides for transmitting light along the surface of a substrate is well known in the art and a promising technique for the fabrication of integrated optical circuits. Optical waveguide junctions are important elements for performing splitting and recombining of optical signals in guided-wave devices such as interferometers and branching circuits. In particular, it has been shown that asymmetric waveguide Y junctions can be used to spatially separate the modes in a double-mode waveguide, which makes them useful, e.g., in three-port optical switches. See, for example, "Dielectric Thin-Film Optical Branching Waveguide", H. Yajima, Appl. Phys. Lett., Vol. 22, June 15, 1973, pp. 647–649, and "Optical-Waveguide Hybrid Coupler", M. Izutsu, A. Enokihara, T. Sueta, Optics Letters, Vol. 7, No. 11, November, 1982, pp. 549–551. The Yajima reference describes the fabrication of branching waveguides with only two output channels of different widths, and with the same index of refraction. Although such prior art devices are capable of simple mode filtering applications, the demands of complex integrated optical circuits require a much greater degree of signal processing functions. Prior to the present invention, there has not been a suitable technique for the fabrication of waveguide junctions capable of a variety of optical signal processing functions such as selective mode excitation, routing, switching, modulation, and wavelength multiplexing/demultiplexing of guided waves, as well as for mode control in semiconductor lasers.

SUMMARY OF THE INVENTION

Briefly, and in general terms, the present invention provides an optical waveguide junction including a multimode input waveguide and a plurality of n spaced apart output waveguides, disposed on a substrate. Each of the output waveguides has a different propagation constant, (e.g., by having different widths or indices of refraction), so that the input modes of optical radiation are sorted in a predetermined way into n groups of output modes corresponding to the n output waveguides. If the input waveguide is excited with optical radiation of different wavelengths, the output waveguides may be tailored with specific widths and indices of refraction to sort the input radiation into the n output waveguides as a function of wavelength, thereby demultiplexing the input optical signal. More generally, the junction may also be utilized with m input waveguides and n output waveguides to implement routing, switching, modulation, and wavelength multiplexing/demultiplexing.

The novel features which are considered as characteristic for the invention are set forth in particular in the appended claims. The invention itself, however, both as to its construction and its method of operation, together with additional objects and advantages thereof will be best understood from the following description of specific embodiments when read in conjunction with the accompanying drawing.

DESCRIPTION OF A PREFERRED EMBODIMENT

Figure 1:
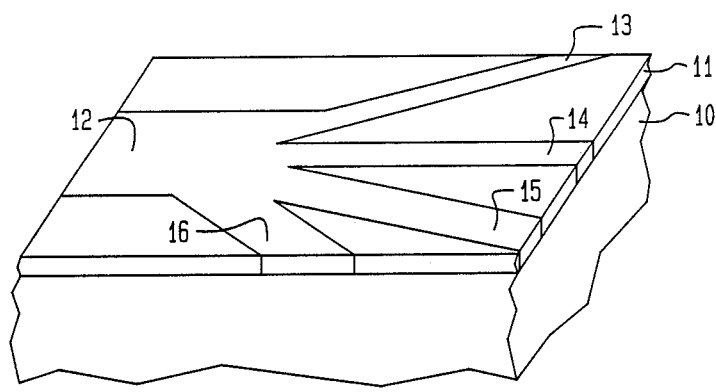
FIG. 1 shows a cut-away perspective view of a first embodiment of the optical waveguide junction for mode sorting according to the present invention.

Turning to FIG. 1, there is shown a cut-away perspective view of an optical waveguide junction for mode sorting of optical radiation according to the present invention. As will be discussed subsequently, a similar configuration may also be used for sorting by wavelength or polarization. The device is implemented on substrate 10 on which a layer 11 of optical material has been formed or deposited. The layer 11 includes an input multimode waveguide 12 for propagating multimode optical radiation.

The fabrication of waveguides on substrates is known in the art and need not be described in detail here. In general terms, in order to manufacture a strip or slab waveguide on a substrate, it is necessary to change the refractive index of some portion of the material so that the effective refractive index of the material surrounding the waveguiding region is less than the effective refractive index of the waveguiding region. Such a structure can guide electromagnetic radiation of the appropriate wavelength by means of total internal reflection.

Optical dielectric waveguides have been made by a variety of fabrication methods on substrates such as glass, lithium niobate, and gallium arsenide (GaAs). However, most optical communication devices use lithium niobate (or lithium tantalate) or GaAs substrates. As noted above, to achieve waveguiding, the refractive index in the guide region must be greater than that of the substrate and the surrounding medium which is generally air.

A plurality of n spaced apart output waveguides 13, 14, 15 and 16 is disposed on the layer of optical material 11 and coupled at a junction to the input waveguide 12. Each of the output waveguides have a different propagation constant (i.e., by having a different width or index of refraction.) In the embodiment depicted in FIG. 1, each of one of the output waveguides 13, 14, 15 and 16 has a width which is different from an adjacent output waveguide. As a result of such configuration, as we shall demonstrate, the multimode input modes are sorted in a predetermined way in n groups of output modes corresponding to the n output waveguides respectively. The physical layout of the output waveguides is such that each of the output waveguides branch from the junction so that the distance between the edge of the waveguide with the edge of an adjacent waveguide increases from zero, i.e., the output waveguides diverge from the junction. In a first preferred embodiment of the present invention, the input waveguide is a single multimode waveguide, and each of the output waveguides is a single mode waveguide.

In the embodiment shown in FIG. 1, each of the output waveguides has a width that is monotonically different from an adjacent output waveguide. For example, the difference in width between the output waveguides is approximately 1 micron. As an example, waveguide 13 may have a width of 2 microns, waveguide 14 a width of 3 microns, waveguide 15 a width of 4 microns, and waveguide 16 a width of 5 microns. The width of waveguide 12 may be 14 microns.

In FIG. 1 each of the waveguides comprise rectilinear strips disposed on said substrate, and at least a portion of the end of the input waveguide is contiguous with each of the output waveguides.

Instead of the output waveguides having a different width, they may have different indices of refraction. As long as each one of the output waveguides has an index of refraction which is different from an adjacent waveguide, the multimode input modes will be sorted in a predetermined way into n groups of output modes corresponding to the n output waveguides respectively. Again, each of the output waveguides should branch from the junction so that the distance between the edge of the waveguide with the edge of an adjacent waveguide increases from zero.

Another embodiment of the present invention is to provide that each one of the waveguides is composed of a different non-linear optical material, the intensity of the input radiation being sufficient so that the effective index of refraction in each output waveguide is different from the effective index of refraction in an adjacent waveguide. Again the multimode input modes will be sorted in a predetermined way into n groups of output modes corresponding to the n output waveguides respectively.

Nonlinear optical material is known in the prior art. The nonlinear index coefficient $n_2$ is defined by the relationship $n = n_0 + n_2 I$, where I is the optical signal intensity, $n_0$ is the linear portion of the refractive index, and n is the total refractive index. Some silicate glasses are attractive materials for fast all-optical devices because they combine nonlinear index coefficients substantially larger than $SiO_2$ with low absorption coefficients, high damage threshold, sub-picosecond nonlinear response times, and compatibility with waveguide fabrication processes. For example, the nonlinear index of

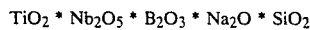

$TiO_2 * Nb_2O_5 * B_2O_3 * Na_2O * SiO_2$ was recently shown to be $4 \times 10^{-19}$ m$^2$/W, a factor of two greater than the largest value previously reported for commercially available $TiO_2$ silicate glasses, and 10 times that for $SiO_2$. See, e.g., "Synthesis and Characterization of $TiO_2$-$Nb_2O_5$ Borosilicate Glasses for Nonlinear Optical Waveguides" E. M. Vogel, S. R. Friberg, J. L. Jackel and P. W. Smith, MRS Symp. Proc. Vol. 88, 1987, pp. 101-105.

Other examples of usable nonlinear optical materials are multiple quantum well heterostructures consisting, e.g., of ultrathin (~10 Angstrom) alternating layers of the compounds GaAs and $Al_xGa_{1-x}As$, at or near 0.85 $\mu$m wavelength.

Figure 2:
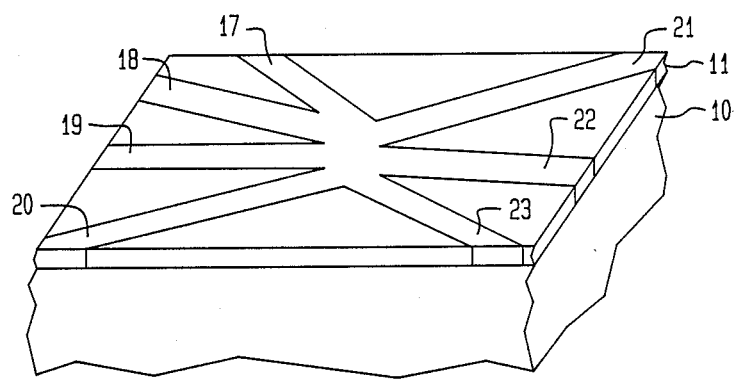
FIG. 2 shows a cut-away perspective view of a second embodiment of the optical waveguide junction according to the present invention.

More generally, a second embodiment of the present invention provides m input waveguides and n output waveguides, where m and n are different integers such as depicted in FIG. 2. FIG. 2 depicts a waveguide junction with four input waveguides 17, 18, 19, and 20 (which may be either single mode or multimode), and three output waveguide 21, 22, and 23 (which may also be either single mode or multimode). The different input and waveguides may be provided with different widths, indices of refraction, or different materials as in the first embodiment.

Figure 3:
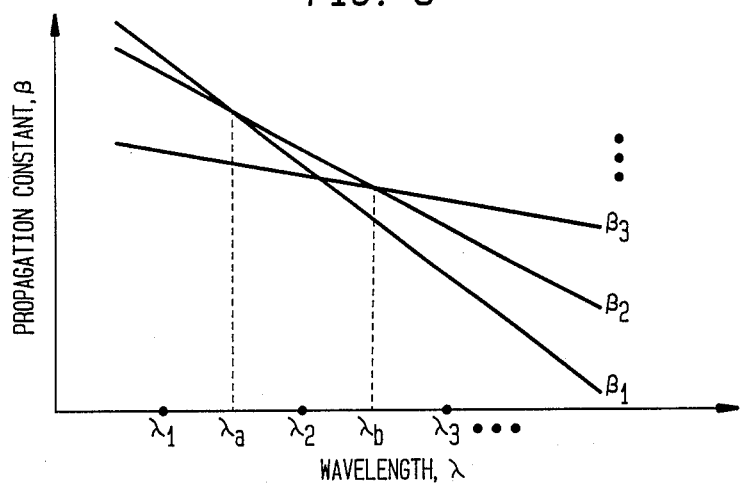
FIG. 3 shows a graph of the dispersion curves for a wavelength multiplexer according to the present invention.

In addition to mode sorting, the present invention is also concerned with an optical waveguide junction for sorting by wavelength. The wavelength-dependent routing schemes of the junctions according to the present invention are useful for wavelength multiplexing-demultiplexing applications. As an example, exciting the lowest order mode of a double-mode waveguide, e.g., by using a tapered coupling to a single-mode input channel, will result in routing of the input power to the wider output channel at $\lambda = 1.5$ $\mu$m or the narrower output channel at $\lambda = 1.3$ $\mu$m. Wavelength multiplexing can be achieved similarly by illuminating the junction from the single-mode channels end. These wavelength multiplexers/demultiplexers can be extended to include more wavelength channels by adding single-mode output channels. In the wavelength demultiplexing mode of operation, the tapered input channel is used to excite the fundamental mode of the multimode junction. The single-mode output channels are designed such that their dispersion curves intersect at different wavelengths, as shown in FIG. 3. As a result, a given input wavelength is routed to the output channel with the highest $\beta_1$ at that particular wavelength.

A demonstration of such routing as a function of wavelength may be explained in connection with FIG. 3.

FIG. 3 shows a graph of the dispersion curves for three distinct output waveguides as a function of wavelength. Dispersion is a parameter which is proportional to the derivative of the index of refraction with respect to the wavelength of light. The difference in the slope of the curves makes it possible to utilize the principle of mode sorting according to the present invention to implement sorting with respect to wavelength. In the example shown in FIG. 3, the three output waveguides have dispersion curves $\beta_1$, $\beta_2$, $\beta_3$ respectively. In the first region of the graph, for wavelengths from 0 to $\lambda_a$, curve $\beta_1$ has the largest propagation constant. Thus, input radiation having a wavelength $\lambda_1$ (which lies between 0 and $\lambda_a$) will be routed into the output waveguide having the largest propagation constant, i.e., $\beta_1$. In the second region of the graph, for wavelengths between $\lambda_a$ and $\lambda_b$, curve $\beta_2$ has the largest propagation constant. Thus, input radiation having a wavelength $\lambda_2$ (which lies between $\lambda_a$ and $\lambda_b$) will be routed to the waveguide with propagation constant $\beta_2$. In the third region of the graph, for wavelengths above $\lambda_b$, curve $\beta_3$ has the largest propagation constant. Thus, input radiation having a wavelength $\lambda_3$ (which lies above $\lambda_b$) will be routed to the waveguide with propagation constant $\beta_3$.

In addition to sorting by mode or wavelength, it is also possible to utilize the technique of the present invention to sort by polarization plane of input beams which are linearly polarized perpendicular to each other. (For brevity, we refer to such different input beams as different polarizations.) A device according to the present invention may be implemented with two output waveguides, the material for each waveguides being selected so that the refractive index is different for different polarizations.

Figure 4:
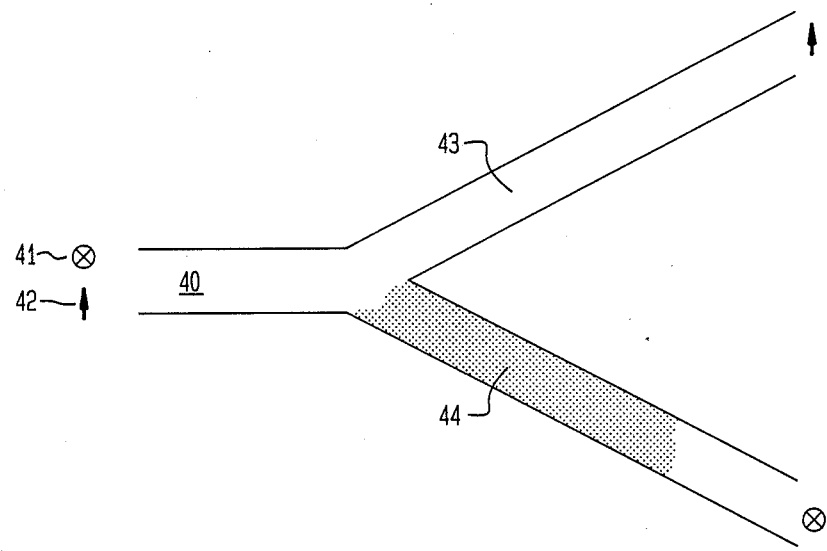
FIG. 4 shows a top plan view of a third embodiment of the optical waveguide junction according to the present invention.

In FIG. 4, we illustrate a top plan view of a third embodiment of the present invention which provides such polarization sorting. In the embodiment of FIG. 4, the input waveguide 40 and one of the output waveguides 43 may be constructed with a polarization insensitive material, such as a multiple quantum well heterostructure of alternating GaAs and $Al_xGa_{1-x}As$ layers, where x is a positive number less than 1. The other output waveguide 44 is constructed with a polarization sensitive material. The effect of the present invention is shown when two different polarizations 41 and 42 are provided in the input waveguides 40, and the junction routes one polarization 42 to output waveguide 43 and the other polarization 41 to output waveguide 44.

Figure 5:
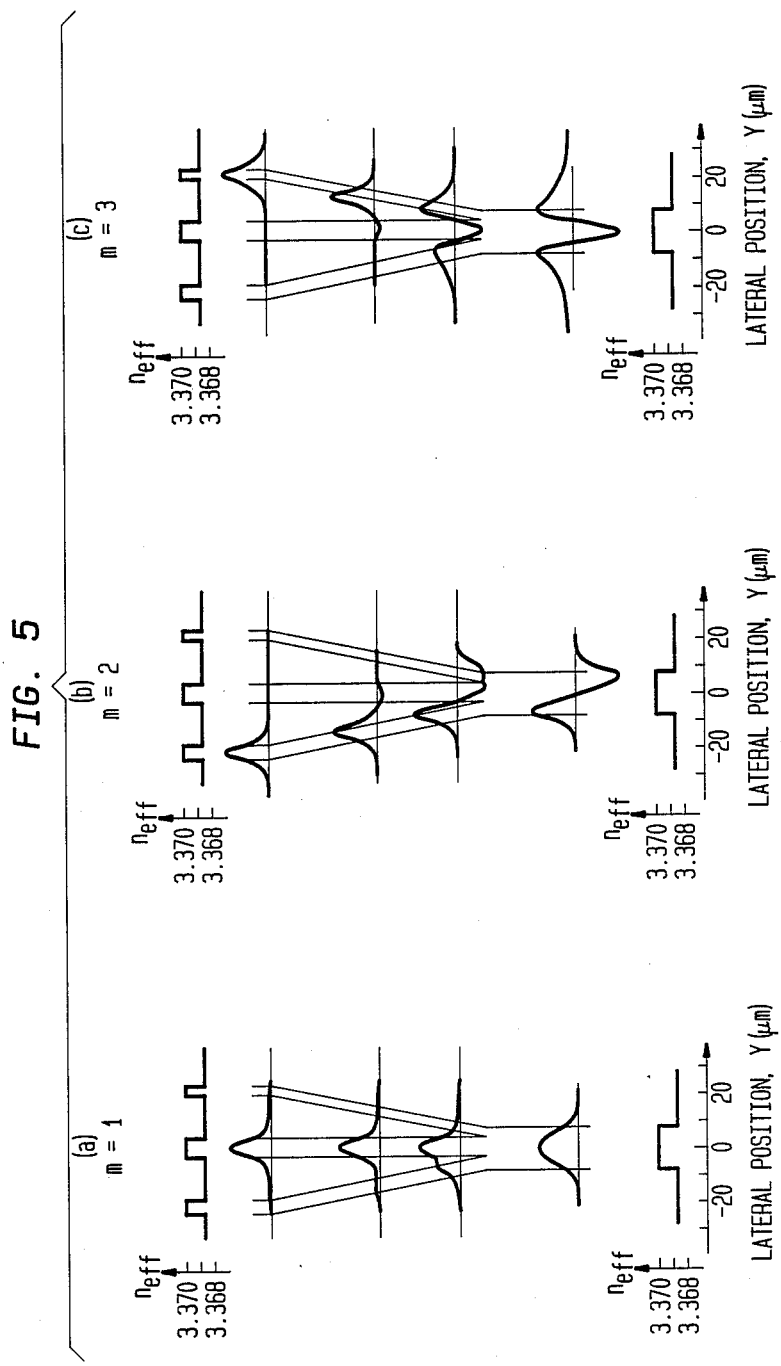
FIG. 5(a), 5(b), and 5(c) shows a highly simplified representation of the field distribution in the optical waveguide junction and along three output waveguides for three distinct modes of optical radiation according to the present invention.

The principle of operation of the multichannel waveguide junctions can be demonstrated by an analysis of the physics of propagation of electromagnetic radiation in guided wave optic channels. As an example, we consider in FIG. 5 a three-mode GaAs/AlGaAs channel input waveguide (e.g., a ridge waveguide) that branches into three single-mode output waveguide channels according to the principles of the present invention. The three-dimensional refractive-index distribution in this waveguide structure was reduced to the two-dimensional effective-index distribution shown by using the effective-index method. The propagation constants of the solitary single-mode channels in the present example are different because of the different channel widths. The field distribution of the three local normal modes, at four locations along the junction may be computed, and is shown in FIG. 5(a), 5(b), and 5(c), respectively. These normal modes were found by solving Maxwell's equations using the effective-index method. It can be seen that the field distribution of each normal mode becomes increasingly localized in a different single-mode channel as the channel separation increases. The first mode (m=1) becomes localized in the widest channel FIG. 5(a), mode m=2 in the intermediate width channel FIG. 5(b), and mode m=3 in the narrowest channel FIG. 5(c). In fact, less than 1% of the total power in each mode is located in any one of the depleted channels [e.g., the two outermost channels in FIG. 5(a)] for channel separation greater than 8.5 $\mu$m.

In the example shown in FIG. 5(a), 5(b) and 5(c), the effective index is 3.3700 in the channels and 3.3683 between them; the channel widths of the three waveguides are 5, 7, and 3 $\mu$m, from left to right in the figure, and the wavelength is 1.5 $\mu$m. The field distribution of each mode are shown at 0, 2, 8, and 16 $\mu$m channel separation. The effective-index $n_{eff}$ distributions at the input and the output are shown in the figure.

The localization features illustrated by FIG. 5 are characteristic of weakly coupled arrays of waveguides of different uncoupled propagation constants. This is in contrast to the situation in arrays of coupled, identical waveguides, in which the power of each normal mode is spread through the array. In general, in an array consisting of coupled waveguides with different uncoupled propagation constants, $\beta_1$, the first mode (i.e., the one with the highest propagation constant), becomes localized in the channel with the highest $\beta_1$, the next high order mode becomes localized in the channel with the next highest $\beta_1$, etc. Effective localization takes place when the difference in the $\beta_1$'s of adjacent channels is much larger than the corresponding interchannel coupling coefficient.

When one of the guided modes of the multimode waveguide is launched, its power will generally be scattered into the other local modes as it propagates down the branching waveguide. For a sufficiently small branching angle, however, most of the launched power will remain in the original mode. Since the intensity distribution in each local mode becomes localized in a different channel, as is illustrated by FIG. 5, the launched power will then be gradually routed into the appropriate output channel.

In principle, the structures according to the present invention can be readily extended to include more output channels in order to handle a larger number of modes. In practice, however, the number of output channels is limited by the increased junction length which is required to achieve effective mode separation with increasing number of modes. This is because a larger number of channels require a smaller difference in the uncoupled channel propagation constants in order to keep the m channels single mode and the multimode waveguide m mode. This small difference, in turn, results in an increase in the channel separation needed for effective localization as well as in smaller branching angles required for small intermode scattering.

The mode-routing characteristics exhibited by the multichannel waveguide junctions described here may also be useful in performing a variety of guided-wave manipulations. Spatial separation of the modes in multimode channel waveguides is useful in studying the modal properties of such waveguides. Furthermore, by exciting the different modes of the multimode input waveguide (e.g., by using a grating coupler configuration) it should be possible to route the incoming beam to each of the output channels. By illuminating the waveguide junction from the single-mode channels end it is possible to selectively excite the different modes of the multimode waveguide, which can be useful in multichannel signal processing systems based on multimode waveguides. Dynamic variation of the propagation constants of the single-mode channels, e.g., via the electro-optic effect or by employing optical nonlinearities, will make the multichannel junctions useful as multiport optical switches and modulators.

Finally, the waveguide junctions might be useful for spatial mode and output wavelength control in semiconductor lasers. For example, a semiconductor laser with a waveguide structure as shown in FIG. 1 will oscillate at a desired spatial mode by pumping the multimode waveguide and the channel to which this mode is routed.

While the invention has been illustrated and described as embodied in an optical waveguide junction, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that from the standpoint of prior art, fairly constitutes essential characteristics of the generic or specific aspects of this invention, and, therefore, such adaptions should and are intended to be comprehended within the meaning and range of equivalence of the following claims.

What is claimed is:

1. An optical waveguide junction for mode sorting of optical radiation comprising:
   a substrate;
   an input multimode waveguide disposed on said substrate for propagating multimode optical radiation; and
   a plurality of n spaced apart output waveguides disposed on said substrate and coupled to said input waveguide, each one of said waveguides having a width which is different from an adjacent waveguide, so that the multimode input modes are sorted in a predetermined way into n groups of output modes corresponding to the n output waveguides respectively, each of said output waveguides branching from said junction so that the distance between the edge of the waveguide with the edge of an adjacent waveguide increases from zero.

2. A waveguide junction as defined in claim 1, wherein said input waveguide is a single multimode waveguide.

3. A waveguide junction as defined in claim 1, wherein each of said output waveguides is a single mode waveguide.

4. A waveguide junction as defined in claim 3, wherein each of said output waveguides have a width that is monotonically different from an adjacent output waveguide.

5. A waveguide junction as defined in claim 4, wherein the difference in width between said output waveguides is approximately 1 micron.

6. A waveguide junction as defined in claim 5, wherein each of said waveguides comprise rectilinear strips disposed on said substrate, and at least a portion of the end of said input waveguide is contiguous with each of said output waveguides.

7. An optical waveguide junction for mode sorting of optical radiation comprising:
   a substrate;
   an input multimode waveguide disposed on said substrate for propagating multimode optical radiation; and
   a plurality of n spaced apart output waveguides disposed on said substrate and coupled to said input waveguide, each one of said output waveguides being made of a material whose index of refraction is different from that of an adjacent output waveguide, so that the multimode input modes are sorted in a predetermined way into n groups of output modes corresponding to the n output waveguides respectively, each of said output waveguides branching from said junction so that the distance between the edge of the waveguide with the edge of an adjacent waveguide increases from zero.

8. A waveguide junction as defined in claim 7, wherein said input waveguide is a single multimode waveguide.

9. A waveguide junction as defined in claim 7, wherein each of said output wavelengths is a single mode waveguide.

10. A waveguide junction as defined in claim 7, wherein each of said waveguides comprise rectilinear strips disposed on said substrate, and at least a portion of the end of said input waveguide is contiguous with each of said output waveguides.

11. An optical waveguide junction for mode sorting of optical radiation comprising:
    a substrate;
    an input multimode waveguide disposed on said substrate for propagating multimode optical radiation; and
    a plurality of n spaced apart output waveguides disposed on said substrate and coupled to said input waveguide, each one of said waveguides being composed of different non-linear optical material, the intensity of the input radiation being sufficient so that the effective index of refraction in each output waveguide is different from the effective index of refraction in an adjacent waveguide, so that the multimode input modes are sorted in a predetermined way into n groups of output modes corresponding to the n output waveguides respectively, each of said output waveguides branching from said junction so that the distance between the edge of the waveguide with the edge of an adjacent waveguide increases from zero.

12. A waveguide junction as defined in claim 11 wherein said input waveguide is a single multimode waveguide.

13. A waveguide junction as defined in claim 11, wherein each of said output waveguides is a single mode wavelength.

14. A waveguide junction as defined in claim 11, wherein each of said waveguides comprise rectilinear strips disposed on said substrate, and at least a portion of the end of said input waveguide is contiguous with each of said output waveguides.

15. An optical waveguide junction comprising:
    a substrate;
    an input multimode waveguide for propagating multimode optical radiation of different wavelengths; and
    a plurality of n spaced apart output waveguides disposed on said substrate and coupled to said input waveguide, each one of said waveguides having a width and a composition which is different from an adjacent waveguide, so that the optical radiation of different wavelengths are sorted by wavelength in a predetermined way into n groups of output radiation of predetermined wavelengths corresponding to the n output waveguides respectively, each of said output waveguides branching from said junction so that the distance between the edge of each waveguide with the edge of an adjacent waveguide increases from zero.

16. An optical waveguide junction for sorting of optical radiation by polarization comprising:
    a substrate;
    an input single mode waveguide disposed on said substrate for propagating optical radiation having two perpendicular polarization modes; and
    first and second spaced apart output waveguides disposed on said substrate and coupled to said input waveguide, each one of said waveguides being composed of a material of different polarization sensitivity, so that the different polarization modes are sorted in a predetermined way into one of said output waveguides corresponding to its polarization sensitivity, each of said output waveguides branching from said junction so that the distance between the edge of the waveguide with the edge of the other output waveguide increases from zero.

* * * * *

UNITED STATES PATENT AND TRADEMARK OFFICE
CERTIFICATE OF CORRECTION

PATENT NO. : 4,846,540

DATED : July 11, 1989

INVENTOR(S) : Elyahou Kapon

It is certified that error appears in the above-identified patent and that said Letters Patent is hereby corrected as shown below:

On the cover page, item [54], change "WAVEGIDE" to read --WAVEGUIDE--.
Column 5, line 60, "distribution" should read --distributions--.
Column 4, line 42, "$\beta_1$" should read --$\beta$--.
Column 6, line 3, "$\beta_1$" should read --$\beta$--;
        line 5, "$\beta_1$" should read --$\beta$--;
        line 7, "$\beta_1$" should read --$\beta$--;
        line 8, "$\beta_1$'s" should read --$\beta$'s--.

Signed and Sealed this

Seventh Day of July, 1992

Attest:

DOUGLAS B. COMER

*Attesting Officer*      *Acting Commissioner of Patents and Trademarks*